April 5, 1938.    H. RANDALL    2,113,142
METHOD FOR THE PRODUCTION OF GRINDING RINGS AND GRINDING
CYLINDERS FROM EMERY AND A BINDING MEDIUM OF RAW RUBBER
Filed July 6, 1937

Patented Apr. 5, 1938

2,113,142

UNITED STATES PATENT OFFICE 2,113,142

METHOD FOR THE PRODUCTION OF GRINDING RINGS AND GRINDING CYLINDERS FROM EMERY AND A BINDING MEDIUM OF RAW RUBBER

Harry Randall, Hilden, Germany

Application July 6, 1937, Serial No. 152,170
In Germany May 28, 1936

2 Claims. (Cl. 51—278)

Grinding rings, which consist of emery and a binding medium of raw rubber, have up to the present been produced in that the material was formed to plates, from which the grinding rings were cut out or stamped out.

This manufacturing method of grinding rings is however complicated and connected with considerable loss of material. Further, tools corresponding to the actual size of the grinding rings are required, said tools being submitted to rapid wear owing to the character of the emery mass.

The invention relates to a method for the production of grinding rings from emery and a binding medium of raw rubber and consists in that the material, i. e., the emery with the binding medium consisting of raw rubber, is rolled out to strips of any desired length, corresponding to the thickness and width of the grinding rings to be produced, these strips being cut into pieces corresponding to the circumference of the grinding rings, these pieces being bent over a ring-shaped core and formed by vulcanizing into a grinding ring.

If two grinding rings produced in this manner of different width and thickness are vulcanized the one on the other, a grinding cylinder is produced from the two grinding rings, such as are clamped in a holder placed on the grinding axle and the end face projecting from the holder is used for treating the workpiece.

This method presents the advantage, that the grinding rings and grinding cylinders can be produced economically and cheaply without loss of material, the tools, which up to the present were necessary for the grinding rings or grinding cylinders and the size of which had to correspond to the actual size of the grinding rings or grinding cylinders being no longer required.

On the accompanying drawing:—

I claim:—

Figure 1:
Fig. 1 shows in top plan view a rolled strip made of the material of the grinding rings and grinding cylinders to be produced.
Figure 2:
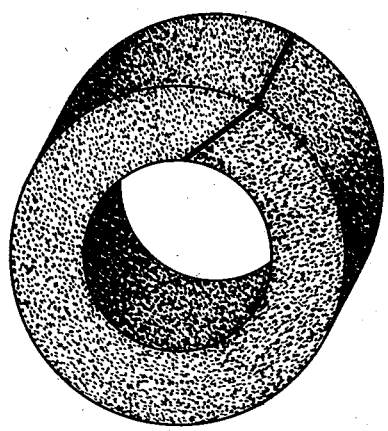
Fig. 2 shows in perspective view a grinding ring made according to the manufacturing method.
Figure 3:
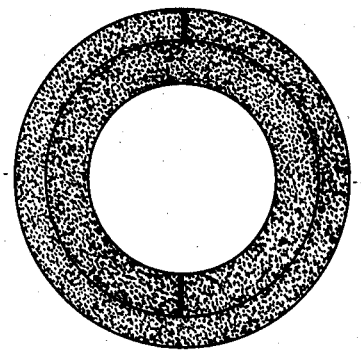
Fig. 3 shows in end view an elevation of a grinding cylinder made according to the method and Fig. 4 is a section on line 3—3 of Fig. 3.
Figure 4:

1. A method for producing grinding rings from emery and a binding medium of raw rubber, consisting in rolling the material to strips of any length and of a thickness and width corresponding to the grinding rings to be produced, in then cutting the strips into sections corresponding to the circumference of the grinding rings to be produced, in bending these sections over a ring-shaped core and in vulcanizing these sections to form a grinding ring.

2. A method for the production of grinding cylinders from emery and a binding medium of raw rubber, consisting in vulcanizing the one on the other two grinding rings of different width and thickness, which have been produced in accordance to the method as specified in claim 1.

HARRY RANDALL.